(12) United States Patent
Mathur

(10) Patent No.: US 11,289,786 B2
(45) Date of Patent: Mar. 29, 2022

(54) METAMATERIAL LOUDSPEAKER DIAPHRAGM

(71) Applicant: Acoustic Metamaterials LLC, Scarsdale, NY (US)

(72) Inventor: Gopal P. Mathur, Trabuco Canyon, CA (US)

(73) Assignee: ACOUSTIC METAMATERIALS LLC, Scarsdale, NY (US)

( * ) Notice: Subject to any disclaimer, the term of this patent is extended or adjusted under 35 U.S.C. 154(b) by 0 days.

(21) Appl. No.: 16/920,470

(22) Filed: Jul. 3, 2020

(65) Prior Publication Data

US 2021/0384602 A1 Dec. 9, 2021

Related U.S. Application Data

(60) Provisional application No. 63/034,234, filed on Jun. 3, 2020.

(51) Int. Cl.
*H01P 3/123* (2006.01)
*H04R 1/42* (2006.01)
(Continued)

(52) U.S. Cl.
CPC ............... *H01P 3/123* (2013.01); *H04R 1/02* (2013.01); *H04R 1/42* (2013.01); *C08J 3/28* (2013.01);
(Continued)

(58) Field of Classification Search
CPC . H04R 1/42; H04R 1/02; H04R 7/127; H04R 2307/204; H04R 7/122; H04R 7/16;
(Continued)

(56) References Cited

U.S. PATENT DOCUMENTS 1,738,853 A * 12/1929 Thayer ................... H04R 7/122
181/168
1,815,987 A * 7/1931 Peterson ................ H04R 7/122
181/164
(Continued)

FOREIGN PATENT DOCUMENTS

WO WO-2009090746 A1 * 7/2009 ............. H04R 7/122
WO WO-2018001234 A1 * 1/2018 ............. F16F 15/02

OTHER PUBLICATIONS

Audioxpress, New High Performance Cone and Diaphragm Technology (Year: 2019).*

*Primary Examiner* — Matthew A Eason
*Assistant Examiner* — Kuassi A Ganmavo
(74) *Attorney, Agent, or Firm* — Michael J. Feigin, Esq.; Feigin and Fridman LLC

(57) ABSTRACT

A metamaterial loudspeaker diaphragm is disclosed. The diaphragm includes a cone structure having a periodic arrangement of two dissimilar materials, e.g., soft and hard, in an alternating periodic pattern to achieve an anisotropic structure, which results in passive amplification of the sound. The anisotropic cone structure includes a baseline cone material and a different, compatible second material. The cone includes a body having a conical cross-section, an interior side, an exterior side, and concentric circles of material alternating between a soft material and a rigid material. Circumferential grooves disposed within the concentric circles include rigid material. Concentric circles including rigid material line the interior side of the body. Substantially all the soft material of the concentric circles is disposed on the exterior side of the cone. Spokes disposed on the exterior side of the cone extend from a base toward a vertex of the cone.

10 Claims, 5 Drawing Sheets

(51) Int. Cl.
*H04R 1/02* (2006.01)
*H04R 7/16* (2006.01)
*C08J 3/28* (2006.01)
*H04R 31/00* (2006.01)
*H04R 7/12* (2006.01)

(52) U.S. Cl.
CPC .............. *H04R 7/122* (2013.01); *H04R 7/125* (2013.01); *H04R 7/127* (2013.01); *H04R 7/16* (2013.01); *H04R 31/003* (2013.01); *H04R 2207/021* (2013.01); *H04R 2307/204* (2013.01)

(58) Field of Classification Search
CPC .. H04R 31/003; H04R 9/04; H04R 2207/021; H04R 7/125; C08J 3/28
See application file for complete search history.

(56) References Cited

U.S. PATENT DOCUMENTS

| | | | | |
|---|---|---|---|---|
| 2,090,025 | A * | 8/1937 | Brennan | H04R 9/041 381/404 |
| 2,269,284 | A * | 1/1942 | Olson | H04R 1/24 381/342 |
| 4,467,656 | A * | 8/1984 | Mallon | G01L 9/0042 338/42 |
| 8,320,604 | B1 * | 11/2012 | Vandersteen | H04R 31/003 381/428 |
| 2003/0215108 | A1 * | 11/2003 | Shelley | H04R 9/022 381/397 |
| 2005/0041830 | A1 * | 2/2005 | Takewa | H04R 9/04 381/410 |
| 2005/0211499 | A1 * | 9/2005 | Schwarzenberg | H04R 7/125 181/167 |
| 2006/0029249 | A1 * | 2/2006 | Setiabudi | H04R 7/00 381/426 |
| 2007/0092101 | A1 * | 4/2007 | McKenzie | H04R 7/122 381/398 |
| 2007/0154044 | A1 * | 7/2007 | Oxford | H04R 1/2888 381/336 |
| 2007/0278033 | A1 * | 12/2007 | Bank | H04R 7/10 181/161 |
| 2010/0002099 | A1 * | 1/2010 | Min | G06F 13/1668 348/231.99 |
| 2010/0020991 | A1 * | 1/2010 | Chen | H04R 7/06 381/162 |
| 2010/0092023 | A1 * | 4/2010 | Bryant | H04R 7/122 381/397 |
| 2011/0228949 | A1 * | 9/2011 | Haba | H04R 7/16 381/86 |
| 2011/0240401 | A1 * | 10/2011 | Suzuki | H04R 7/02 181/157 |
| 2013/0142379 | A1 * | 6/2013 | Varla | H04R 7/16 381/400 |
| 2013/0241123 | A1 | 9/2013 | Enoch et al. | |
| 2018/0220226 | A1 * | 8/2018 | Tanabe | H04R 7/122 |
| 2019/0321852 | A1 * | 10/2019 | Shahosseini | G10K 13/00 |
| 2019/0335276 | A1 * | 10/2019 | Xie | H04R 31/003 |

\* cited by examiner

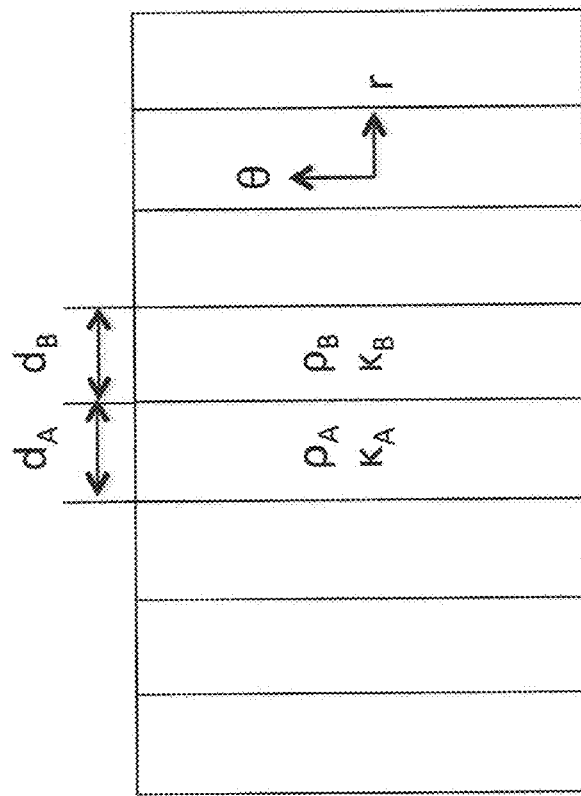
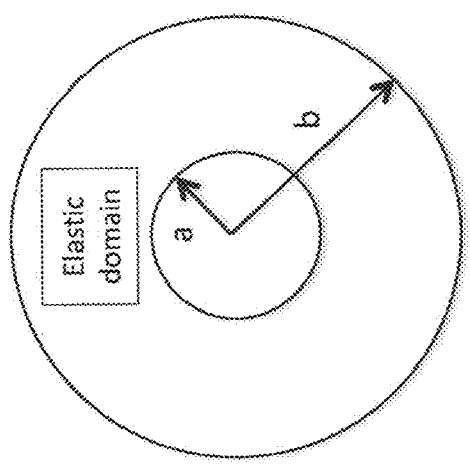
FIG. 1A
FIG. 1B

METAMATERIAL LOUDSPEAKER DIAPHRAGM

FIELD OF THE DISCLOSED TECHNOLOGY

The disclosed technology relates generally to loudspeaker diaphragms. More specifically, the disclosed technology relates to a loudspeaker diaphragm having structural metamaterial that improves the sound radiation thereof.

BACKGROUND OF THE DISCLOSED TECHNOLOGY

Loudspeakers are integral/critical parts of all audio systems. However, loudspeakers are known as the weakest link in any sound reproduction scheme. Ideally, it should create a sound field proportional to the electric signal of the amplifier. Due to the physics of sound radiation, this paradigm has not been achieved, particularly in the low frequency region (<300 Hz). The low efficiency of the loudspeaker generates more heat than sound power output while adding undesired distortion to the output signal. The frequency response of a conventional loudspeaker usually rolls off faster at low frequencies.

The resonant frequency of a speaker, $f_0$, is the frequency below which a loudspeaker is increasingly unable to generate sound output for a given input signal. The loudspeaker cone resonance is of particular importance because the output from the speaker falls at a rate of 12 dB/octave below this frequency. As a result, the lower the speaker cone resonance frequency the better the bass response. At this frequency, the weight of the moving parts of the speaker becomes balanced with the force of the speaker suspension when in motion. With a loudspeaker, the mass of the moving parts, and the stiffness of the suspension (surround and spider) are the key elements that affect the resonant frequency.

The loudspeaker cone or speaker diaphragm is one of the major elements of the speaker with requirements of rigidity and low mass. Ideally speaker diaphragm material would be as light as air and strong as steel. Unfortunately, in the real world, that material just does not exist. All diaphragm materials are a compromise between strength and lightness—at one extreme a metal like aluminum, which has strength but bad damping, allowing for ringing if it is not properly treated. At the other extreme, there are soft materials like silks.

The speaker cone design is critical to the performance of the overall loudspeaker and has requirements that are difficult to meet to obtain the optimum performance. The main requirements are that the speaker cone or diaphragm should be low mass, but rigid. These requirements are not easy to achieve as rigid cones often require more mass, and low mass cones tend not to be so rigid. Whilst the two main requirements for speaker cones appear to be mutually exclusive, clever design and the innovative use of materials can enable some very high-performance loudspeakers to be designed and manufactured. Another requirement for a speaker cone material is that it should be self-damping. This helps reduce the effects of self-resonances which can color the sound.

Since most desirable characteristics of materials used for the loudspeaker cone appear to be high modulus E, low density p, moderate internal loss and low overall weight. A large value of the ratio E/p is thus needed to extend the high frequency limit and to reduce harmonic distortion. With this in mind, paper-honeycomb-paper sandwich multi-layer construction having high rigidity moderate internal loss characteristics and low overall weight has also been considered for loudspeaker cones.

To improve sound quality, different speakers need to focus on producing different sounds. Each speaker must only produce sounds within the limited frequency range. This allows the driver to specialize within the frequency band so that it does not need to reproduce too many sounds at the same time causing sound distortion. As a result, the most common setup to deliver the balanced sound is to have three separate speakers where one is responsible for high-frequency sound delivery and the other two for mid-range and bass, respectively. To achieve an overall balanced sound, the three speakers are usually placed in a single enclosure often referred to as a loudspeaker system. With all types of speakers built-in, the loudspeaker is usually designed to cover the full spectrum of human hearing that ranges from 20 to 20,000 Hz.

The diaphragm is one of the most important parts of a speaker, and sound is generated by vibrations of the diaphragm. The diaphragm is also called a "cone" and it generates sound waves through variation of vibrations received from voice coil. For purposes of this disclosure "cone" is defined as "having a conical cross-section which radially decreases from a larger circle to a smaller circle which, if continued past said smaller circle would reach a vertex." The cone is the biggest factor determining the frequency response and overall sound of the loudspeaker. It also suffers the greatest mechanical demands and so is a big influence on the power rating. In addition to this, the shape or profile of the cone is also critical. For example, a driver designed for a 2-way system will have a different cone profile to a subwoofer. The diaphragm determines most of the sound quality of the speaker, and frequency characteristics, like sound quality change depending on the material, thickness, shape, etc.

The body of the cone can be made from an almost infinite variety of material and blends of materials, both man-made and natural, and then treated with a variety of resins and lacquers in different concentrations. The combination of stiffness, weight, damping and resilience of these materials all need careful consideration in order to get the best acoustic performance. There are different materials used in making speaker cones. These materials include paper, plastic, fabric, and metal. Each cone material has a certain impact on the performance of a speaker. There is an unending debate on which cone material performs the best. There are certain characteristics that make one material more ideal over the other.

The main goal when choosing a speaker cone material is a material that reproduces voice coil signals in the most accurate way and with minimal distortion. As such, the best material is one that maintains tight movement and maximizes the point at which frequency breakup occurs.

All cone materials have advantages and disadvantages. The three main properties designers look for in cones are light weight, stiffness, and lack of ringing. Exotic materials like Kevlar and magnesium are light and stiff, but can have ringing problems, depending on their fabrication and design. In U.S. Patent Application Pub. No. 2004/0146176 to Wei-Chung Wu (hereinafter "Wu"), a paper-honeycomb-Paper sandwich multi-layer loudspeaker cone structure is put forth as a loudspeaker cone. The main objective of this construction is to provide a high rigidity, moderate internal loss characteristics and low overall weight.

To produce deep bass, a woofer cone must pump a considerable volume of air. A small cone naturally moves less air than a big cone. Yet by traveling over a greater distance with each back-and-forth stroke, even a relatively small cone can drive enough air to generate effective bass. In consequence, a well-designed 8-inch woofer with a long cone throw is apt to produce better bass than a 12-inch woofer of less exacting construction. Thus, size is not the sole determinant of bass response. However, once the design of the loudspeaker is finalized, not much can be done to change its characteristics.

The mechanical properties of natural materials cover a specific, limited range. This fundamentally limits material properties with respect to each other creating trade-offs when selecting materials for a specific application, like loudspeaker diaphragm.

As previously discussed, the ideal material for a loudspeaker cone would be one with extreme rigidity but with exceptionally low density. Since such a material is exceedingly difficult to find in nature, metamaterials offer designs which can satisfy such stringent criteria. The concept of metamaterials was originally introduced for electromagnetic waves and received significant attention over the last decade, due to unusual interaction of these man-made materials with waves, as in the case of negative refraction materials. More recently, the metamaterial concept has been extended to structural or flexural waves in a variety of scenarios of interest such as flexural clocking. Several challenges still hold in applying metamaterials to realistic devices, in particular when low losses and wide bandwidths of operation are desired, as most of their exotic features are based on resonant inclusions.

In metamaterials, one aims at steering or redirecting waves in a desired manner around an object. However, when designing a structure to perform such a task, an "inverse problem" is generally encountered which is to find a structure that leads to the desired wave's behavior. Since metamaterials are engineered materials that exploit the geometry of their internal structure to manipulate propagating waves, structural metamaterials can be designed using concept of anisotropy and multilayered structure, explained in detail below to guide structural/flexural waves in a desired way.

Intuitively, the idea of cloaking is to guide the wave around an object to let the wave emerge behind the object as if the object were not there. For a circular object and a circular cloak around it, the radial and the azimuthal phase velocity components of the cloak need to be different. A larger azimuthal phase velocity allows the wave to make up for the additional propagation time due to the increased path length it must propagate over when making the detour around the object.

U.S. Patent Application Publication No. 2013/0241123 to Enoch et al. (hereinafter "Enoch") shows a structure for bending transversal elastic waves around a zone to isolate of a plate. The wavelengths of the elastic waves to bend are large with respect to the thickness of the plate and small with respect to the other dimensions of the plate. Enoch's basic claim is a process for bending transversal elastic waves around a zone to isolate of a plate, the process comprising: forming, around the zone to isolate, a structure presenting an anisotropic Young's modulus and/or heterogeneous mass density, the wavelengths of the elastic waves to bend being large with respect to the thickness of the plate and small with respect to the other dimensions of the plate.

"Experiments on Elastic Cloaking in Thin Plates," authored by Nicolas Stenger et al, PRL 108, 014301 (2012) (hereinafter "Stenger") and Enoch introduced a process to make the above referenced elastic cloak feasible. Particularly, they fabricated metamaterial layers consisting of a composite of two polymers, a PVC plate with PDMS inclusions. Then, upon changing the filling fraction of the PDMS inclusion they were able to tailor the properties of the concentric layers forming the cloak.

In a loudspeaker cone, however, one does not attempt to isolate a particular zone or divert bending waves around an object on the cone. Instead the objective is to achieve the basic anisotropy property of metamaterial by using two dissimilar materials, which an isotropic elastic material does not possess. Thus, the basic metamaterial principles can be used to design anisotropic cone structures that are different than the structures of previous patents, as they are also based on the same principles. The engineered flexural anisotropy is integral to such effects. Accordingly, in the current application, effect of slow sound speed and low elastic modulus is of more importance. Specifically, design of an anisotropic structure with low longitudinal wave speed ($C_L$ in circumferential direction is preferred and discussed. The objective here is to provide an anisotropic loudspeaker cone, which is vastly different from providing an elastic cloak for the purpose of bending flexural waves. Indeed, there is no attempt to disclose an elastic cloak to steer circumferential elastic waves around some object on the cone.

Structural metamaterials usually gain their properties from their arrangement rather than composition, using the inclusion of small periodically arranged inhomogeneities to enact effective macroscopic behavior. Accordingly, the use of layered anisotropic arrangement to achieve desired impedance characteristics in the herein disclosure takes advantage of its constituent sub wavelength properties rather than its overall material characteristics.

SUMMARY OF THE DISCLOSED TECHNOLOGY

Disclosed herein is a metamaterial loudspeaker diaphragm including a speaker cone having concentric circles of material alternating between a soft material and a rigid material, wherein the concentric circles substantially form a cone which extends from a base towards a vertex.

In embodiments, the speaker cone includes circumferential grooves disposed within each of the concentric circles that include rigid material. In some embodiments, the concentric circles of the soft material have a portion which extends into one of the circumferential grooves of a concentric circle that includes rigid material.

In other embodiments, the concentric circles that include rigid material substantially line an interior side of the cone. In certain embodiments, the concentric circles that include rigid material include spokes that extend from a base toward a vertex of the speaker cone. The spokes may be disposed on an exterior side of the speaker cone, while substantially all of the soft material of the concentric circles is also disposed on the exterior side.

In embodiments, the hard material is harder than the soft material by a factor of at least 1 million. The soft material may be silicone. Further, the soft material may be at least 60% of material of the concentric circles.

In some embodiments, the speaker cone is rigid in a radial direction and alternatingly soft and hard in a circumferential direction.

In other embodiments, the speaker cone may include alternating circumferential layers of soft material and hard material, wherein the hard material extends radially from a base toward a vertex of the cone. In certain embodiments, the soft material and the hard material are soft and hard relative to one another by a factor of at least 1 million. In one embodiment, an interior side of the speaker cone is substantially all hard material. In another embodiment, in a circumferential direction of the speaker cone the majority of the material of the cone is soft material.

In embodiments, the alternating circumferential layers of soft material and hard material are supported by radially extending spokes.

In some embodiments, at least some of the soft material is held to at least some of the hard material by way of circumferentially extending grooves in the hard material.

For purposes of this disclosure, the following definitions are used. "Diaphragm" is defined as "the portion of a loudspeaker that vibrates when receiving or producing sound waves." "Damping" is defined as "a decrease in the amplitude of an oscillation as a result of energy being drained from the system to overcome frictional or other resistive forces." "Resonance" is defined as "the reinforcement or prolongation of sound by reflection from a surface or by the synchronous vibration of a neighboring object." "Distortion" is defined as "the alteration of the waveform of an information-bearing signal, such as an audio signal representing sound in an electronic device." "Metamaterial" is defined as "as an artificial composite that gains its electrical/mechanical properties from its structure rather than inheriting them directly from the materials it is composed of." "Anisotropic" is defined as "having a physical property that has a different value when measured in different directions." "Anisotropy" is defined as "the property of a material which allows it to change or assume different properties in different directions." "Isotropic" is defined as "having a physical property which has the same value when measured in different directions, or not varying in magnitude according to the direction of measurement." "Isotropy" is defined as "uniformity in all orientations." "Radial" is defined as "diverging from a common center." "Azimuth" is defined as "the angle the sound source makes compared to the imaginary straight line that is drawn from within the head through the area between the eyes." "Concentric" is defined as "of or denoting circles, arcs, or other shapes which share the same center." "Circumferential" is defined as "denoting or relating to the circumference of a curved geometric figure." "Soft" is defined as "easy to mold, cut, compress, or fold; not hard or firm to the touch." "Rigid" is defined as "unable to bend or be forced out of shape; not flexible." "Passive amplification" is defined as "the amplification of sound without the use of power by changing the impedance of the air around a speaker to maximize efficiency."

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof.

BRIEF DESCRIPTION OF THE DRAWINGS

FIG. 1A shows a schematic view of the structure of the metamaterial loudspeaker diaphragm according to one embodiment of the present disclosure.

FIG. 1B shows a schematic view of the structural elastic domain of the metamaterial loudspeaker diaphragm according to one embodiment of the present disclosure.

DETAILED DESCRIPTION OF EMBODIMENTS OF THE DISCLOSED TECHNOLOGY

Figure 2:
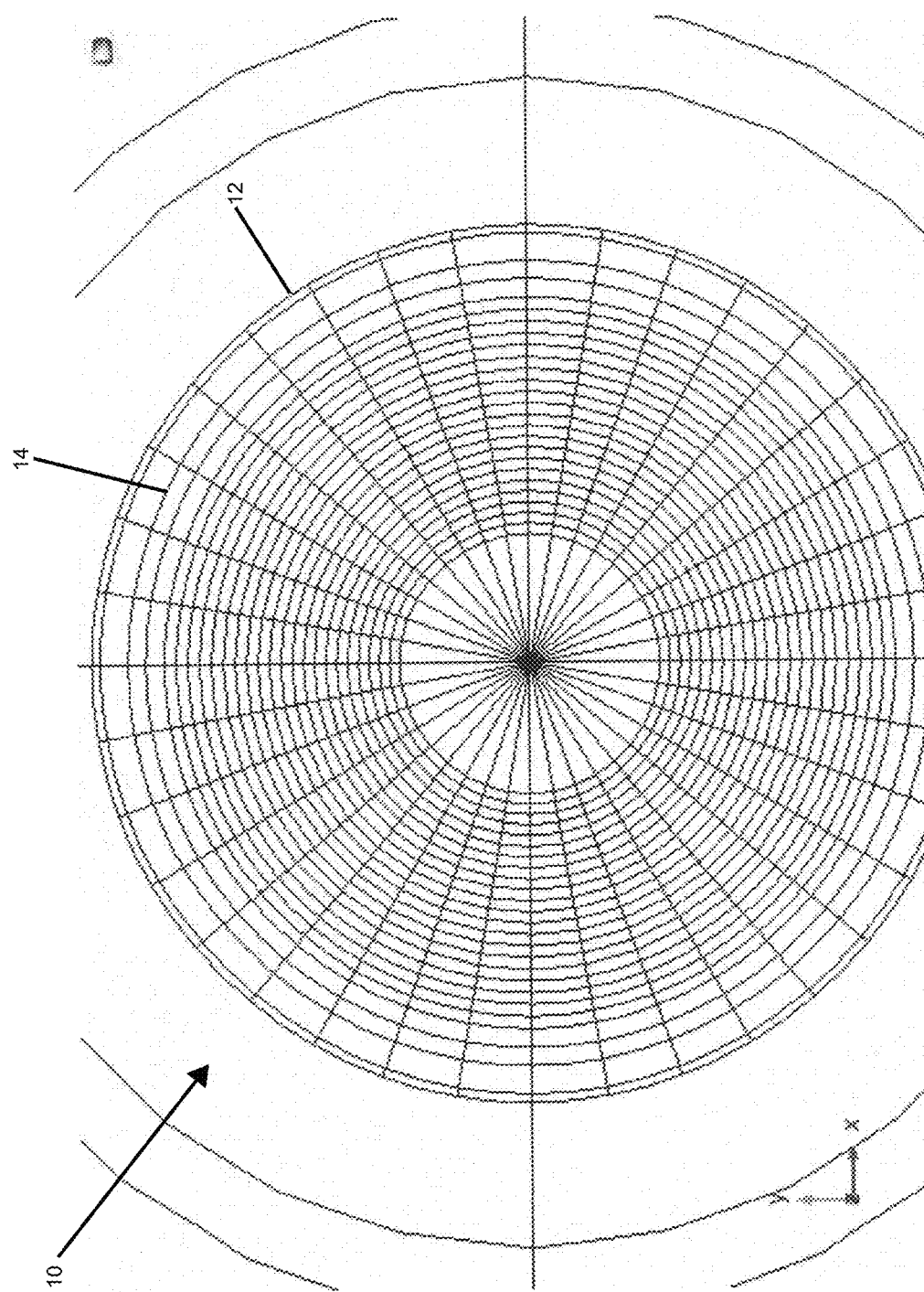
FIG. 2 shows a schematic view of the metamaterial loudspeaker diaphragm, illustrating the cone divided into concentric rings according to one embodiment of the present disclosure.

The present disclosed technology provides a metamaterial loudspeaker diaphragm including a cone structure providing passive sound enhancement of sound. The metamaterial cone structure employs a periodic arrangement of two dissimilar materials in an alternating periodic pattern to achieve an anisotropic structure, which results in passive amplification of the sound. The anisotropic cone structure can be achieved by using a variety of different materials, starting with the baseline cone material and selecting a different, compatible/suitable second material. The structural integrity and vibration resonance of the cone is retained in this new anisotropic material. The radial elastic properties of the new structure are still about the same as the baseline cone structure, whereas the azimuthal/circumferential properties of the cone structure would have changed in the resulting anisotropic structure. Thus, sound emanating from a speaker will improve until the first resonance frequency due to the lower longitudinal wave speed in the azimuthal direction. Above the first resonance frequency, anisotropic structure design will still be effective with larger enhanced structural resonances which can be damped. The sound from the speaker is radiated at all frequencies.

FIG. 1A shows a schematic view of the structure of the metamaterial loudspeaker diaphragm according to one embodiment of the present disclosure. FIG. 1A illustrates the concept of anisotropy using a periodic arrangement of multilayer structure with the incident wave in the r-direction. Each layer is composed of isotropic and homogenous materials with mass density $\rho A$ and $\rho B$ and bulk modulus $\kappa A$ and $\kappa B$. The thickness of each layer is much smaller than the wavelength so the whole stack can be treated as a single anisotropic material using effective medium theory. The homogenized density tensor and bulk modulus can be expressed as $$\rho_r = \frac{\rho_A + \eta \rho_B}{1+\eta}, \frac{1}{\rho_\theta} = \frac{1}{1+\eta}\left(\frac{1}{\rho_A} + \frac{\eta}{\rho_B}\right)$$

$$\frac{1}{\kappa} = \frac{1}{1+\eta}\left(\frac{1}{\kappa_A} + \frac{\eta}{\kappa_B}\right)$$

where $\eta = d_B/d_A$ is the ratio of thicknesses for the B and A layers, $\rho_r, \rho_\theta$ are the radius and angular components of the effective anisotropic density tensors respectively, and $\kappa$ is the effective bulk modulus.

The disclosed loudspeaker cone moves as a rigid body, due to in-plane waves, at low frequencies where, longitudinal waves dominate loudspeaker vibrations. As the excitation frequency increases, the transverse velocity of the cone surface becomes non-uniform, since the amplitude of the vibration increases towards the base of the cone, where bending waves can propagate. At high enough frequencies the whole cone is dominated by bending waves. The longitudinal wave speed is given by $$C_L = \sqrt{\frac{Y}{\rho}},$$

where, Y is the Young's modulus and ρ is density of the material. The preliminary guideline that the high impedance of the loudspeaker diaphragm (i.e., higher than acoustic impedance) restricts sound radiation at low frequencies indicates the prominent role of longitudinal wave speed of sound in the diaphragm material.

At low frequencies, the loudspeaker is usually assumed to be a rigid piston and the cone will move as a rigid body. However, the cone itself is not rigid at high frequencies and should be modeled as a flexible system. For example, at 100 Hz the cone moves almost as a rigid body, and the amplitude of motion in the azimuthal (or circumferential direction, θ, is much greater than that in the radial direction, r. The dynamic behavior at a given position along the cone depends on whether the excitation is above or below the ring frequency at this location. The ring frequency is given by $$f_R = C_L/2\pi R$$

where R is the distance between the cone and cone axis measured perpendicular to the cone meridian. Since the ring frequency varies along the length of the cone the dynamic behavior of the cone depends on whether the frequency is in one of three regions, namely, longitudinal, longitudinal/bending, and/or bending.

Since isotropic materials used for loudspeaker cone construction have same elastic properties in radial and circumferential (r, θ) directions, longitudinal wave speeds are equally high in both directions in the material. For example, longitudinal wave speed in carbon fiber epoxy material (E=574×10$^9$ and density of 1550 Kg/m$^3$) is about 19240 m/s, which is much higher than speed of sound (343 m/s). Since isotropic materials used in loudspeaker cone can range from PVC and polypropylene to Beryllium and more exotic materials with extremely high Young's modulus, other material is needed which has exceptionally low elastic modulus and/or low speed of sound. Accordingly, the present disclosure employs acoustic metamaterials with exceptionally low sound speeds, as low as 60 m/s with accompanying low Young's modulus. Such acoustic metamaterials are composed of soft, porous silicone rubbers.

The control of sound wave propagation in metamaterials is of primary importance in the present disclosure. Highly compressible air-filled pores may strongly soften the material, mostly by decreasing the longitudinal modulus Y, which leads to a decrease of the longitudinal sound speed $C_L$. Soft porous silicone rubbers have been demonstrated to exhibit extremely low sound speeds of tens of m/s for these dense materials, even for low porosities of the order of a few percent. By controlling both the porosity and the elastic characteristics of the matrix allows for a full control over the acoustic index in materials.

As stated above, a periodic arrangement of multi-layered structure using two different properties can result in an anisotropic structure. If two layers have drastically different properties than vastly different properties can be achieved in two directions, e.g., longitudinal and transverse directions. For example, in one embodiment of the present disclosure, a carbon fiber epoxy glass sheet (elastic modulus of 574×10$^9$ and density of 1550 Kg/m$^3$) with soft silicon layers (with elastic modulus of 1.3×10$^4$ and density of 500 Kg/m$^3$) is used for the multi-layer period arrangement and results in an anisotropic material with an effective bulk modulus of κ=1.1987×10$^{09}$ and $Y_\theta$=2.6×10$^4$ and densities $\rho_r$=1030 Kg/m$^3$ and $\rho_\theta$=756 Kg/m$^3$. These anisotropic elastic properties are effectively used for the loudspeaker cone structure to enhance sound radiation.

Figure 3:
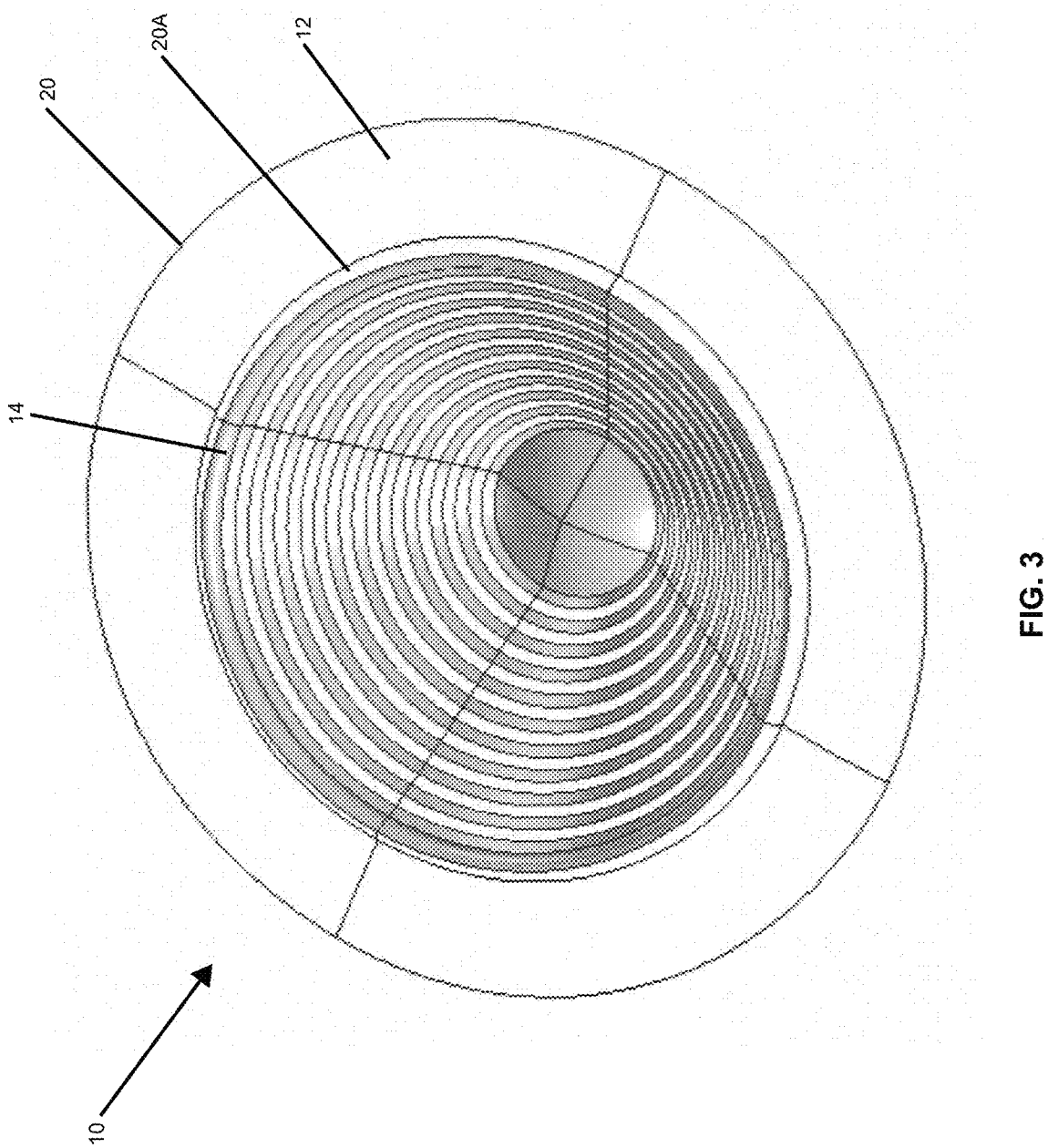
FIG. 3 shows a perspective view of the metamaterial loudspeaker diaphragm, illustrating the cone divided into concentric rings with baseline material according to one embodiment of the present disclosure.
Figure 4:
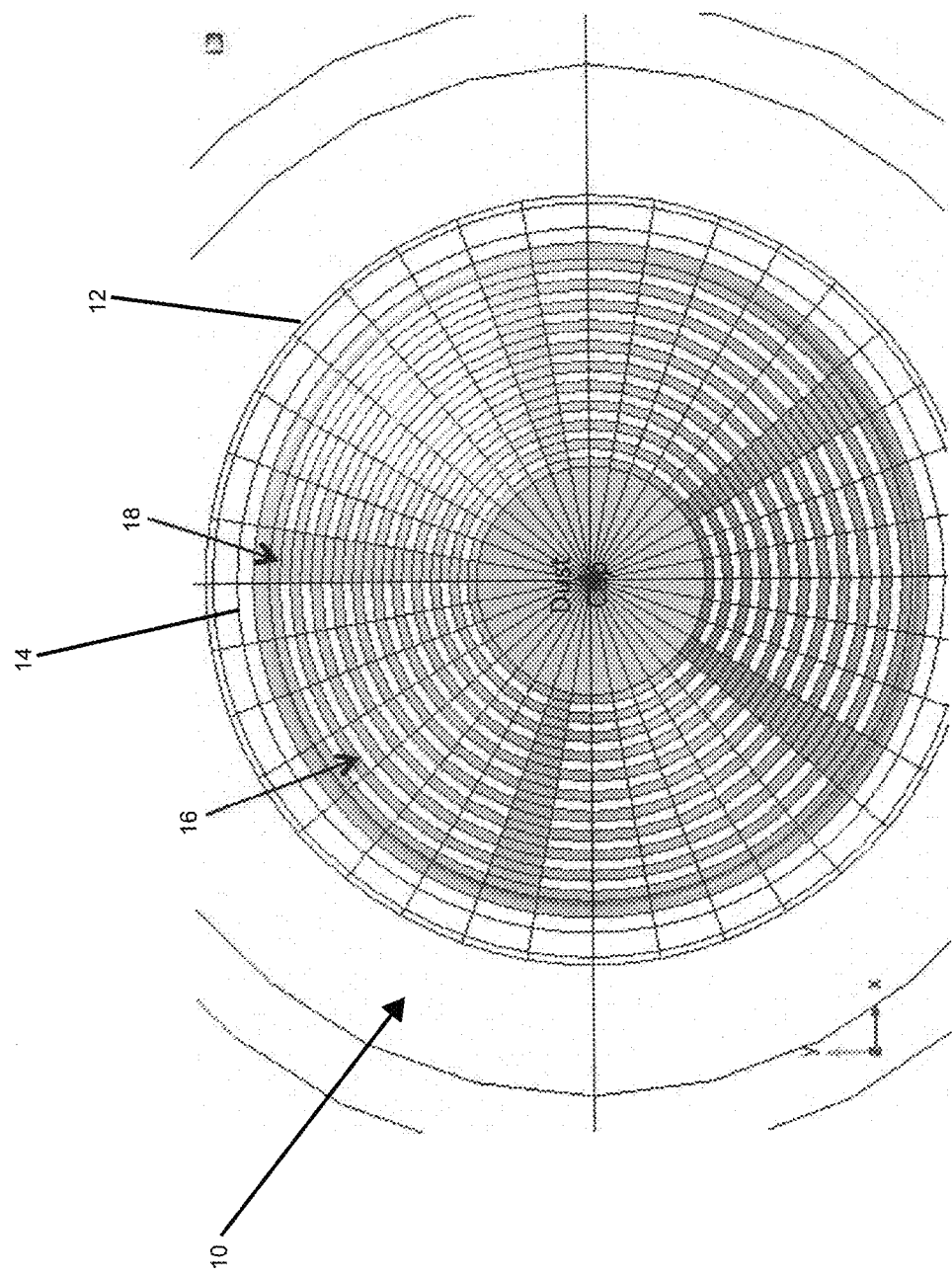
FIG. 4 shows a schematic view of the metamaterial loudspeaker diaphragm, illustrating the spokes of the concentric rings with baseline material according to one embodiment of the present disclosure.
Figure 5:
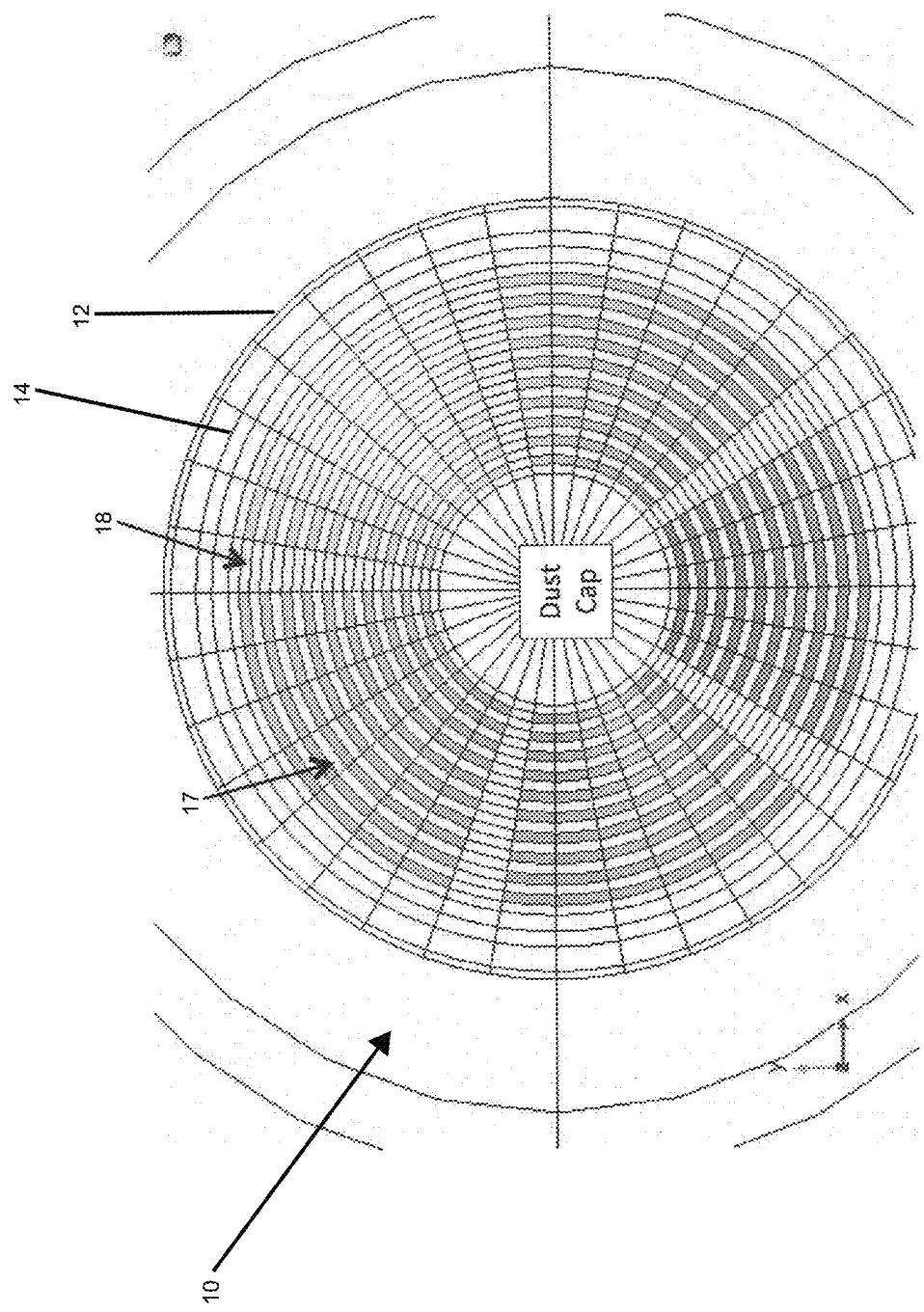
FIG. 5 shows a perspective view of the metamaterial loudspeaker diaphragm, illustrating the cone divided into concentric rings which alternate with baseline material and silicone material according to one embodiment of the present disclosure.

Referring now to FIGS. 2-5, simultaneously, FIG. 2 shows a schematic view of the metamaterial loudspeaker diaphragm, illustrating the cone divided into concentric rings according to one embodiment of the present disclosure. FIG. 3 shows a perspective view of the metamaterial loudspeaker diaphragm, illustrating the cone divided into concentric rings with baseline material according to one embodiment of the present disclosure. FIG. 4 shows a schematic view of the metamaterial loudspeaker diaphragm, illustrating the spokes of the concentric rings with baseline material according to one embodiment of the present disclosure. FIG. 5 shows a perspective view of the metamaterial loudspeaker diaphragm, illustrating the cone divided into concentric rings which alternate with baseline material and silicone material according to one embodiment of the present disclosure.

In conjunction, FIGS. 2-5 show anisotropic cone structures realized by using periodic arrangement of alternating layers of differing materials. FIG. 2 shows the anisotropic metamaterial loudspeaker diaphragm 10 comprising a loudspeaker cone 12 divided into concentric circles 14. FIG. 3 shows alternate concentric circles of baseline material 16, such as carbon fiber epoxy or fiberglass. The concentric circles of the second material 17, such as soft porous silicon, are shown in FIG. 5. In embodiments, the hard material includes an elastic modulus of 574×10$^{10}$ and a density of 1550 Kg/m$^3$), while the soft material includes an elastic modulus of 1.3×10$^4$ and density of 500 Kg/m$^3$. To achieve continuous flexural rigidity, several spokes 18 around the cone 12 are retained to be made of the baseline material.

In embodiments of the disclosed technology, the metamaterial loudspeaker diaphragm 10 includes the speaker cone 12 having a body 20 having a conical cross-section which radially decreases from a larger circle to a smaller circle which, if continued past said smaller circle would reach a vertex. The body 20 includes an interior side 20A and an exterior side (not shown). The body 20 may be rigid in a radial direction and alternatingly soft and hard in a circumferential direction.

The plurality of concentric circles 14 of material alternate between a soft material and a rigid material. The concentric circles comprise circumferential grooves disposed within each of the concentric circles 14. The circumferential grooves include, or are filled with, soft material. In some embodiments, the concentric circles 14 that include soft material have a portion which extends into one of the circumferential grooves of a concentric circle that includes rigid material. The concentric circles 14 that include rigid material substantially line the interior side 20A. Substantially all the soft material of the concentric circles 14 may be disposed on the exterior side. The hard material is harder than the soft material by a factor of at least 1 billion. In embodiments, the soft material is preferably silicone and may comprise at least 60% of all of the material that makes up the concentric circles 14.

The spokes 18 extend from a base of the cone 12 (not shown) toward a vertex of the cone 12 (not shown). The spokes 18 may be disposed on an exterior side of the speaker cone 12. Substantially all the soft material of the concentric circles 14 may be disposed on the exterior side.

In other embodiments, the speaker cone 12 may include alternating circumferential layers of soft material and hard material, wherein the hard material extends radially from a base toward a vertex of the cone 12.

In order to build the anisotropic metamaterial loudspeaker diaphragm 10 of the present disclosure, a two-layer construction may be desired. The construction process may start with a cone made of baseline material of appropriate thickness. The base and alternate layers are thus made of the baseline material (e.g., carbon fiberglass epoxy or other suitable material). The alternate layers of soft silicone material, as shown in FIG. 5, are filled into concentric circles cut or drilled in the baseline disc to a depth of about 60 to 80%, leaving the remaining thickness of facing of baseline material.

Using meta material layers, anisotropy of elastic properties of the entire loudspeaker diaphragm can be controlled (or tailored) according to the required frequency characteristics of the radiated sound field.

At lower frequencies, the process may be more complex, as outer part of the diaphragm may be more involved in sound radiation than inner dome. This may cause re-distribution of meta material rings as per design requirements.

The effective parameters of such layered system can also be tuned by selecting proper parameters for A and B, and/or by changing the η, where $\eta=d_B/d_A$ is ratio of thicknesses for the B and A layers (FIG. 1).

The concentric ring structure can also be made of materials with graded elasticity which will effectively lead to the desired anisotropy of the loudspeaker cone, for example, in the case of a low frequency sub-woofer.

Finally, one can optimize and arrive at a meta material diaphragm design which can meet requirements for elastic modulus and density in orthotropic directions.

Alternatively, the metamaterial cone may be made involving fabrication steps suitable for particular manufacturing processes.

The present technology can be carried out with one or more of the embodiments described. The drawings show embodiments with the understanding that the present description is to be considered an exemplification of the principles and is not intended to be exhaustive or to limit the disclosure to the details of construction. The arrangements of the components are set forth in the following description or illustrated in the drawings.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A speaker cone, comprising:
a body including a conical cross-section having a first end including a base, a second end including a vertex, said first end opposite said second end, an interior side, and an exterior side, said interior side opposite said exterior side, said body tapering in circumference from said first end toward said second end, said body rigid in a radial direction and alternating soft and hard in a circumferential direction;
a first plurality of concentric circular regions formed of a soft material and a second plurality of concentric circular regions formed of a rigid material, said concentric circular regions of said first and second plurality of concentric circular regions alternating in arrangement along said body from said first end to said second end such that said first and second plurality of concentric circular regions taper in circumference from the base to the vertex;
a circumferential groove disposed within each of said plurality of concentric circles, said circumferential grooves including a rigid material;
wherein said concentric circles of said first and second plurality of concentric circular regions substantially form a cone which extends from a base towards a vertex.

2. The speaker cone of claim 1, wherein a concentric circle circular region of said first plurality of concentric circular regions formed of soft material has a portion thereof which extends into one of said circumferential grooves within a concentric circular region of said second plurality of concentric circular regions formed of rigid material.

3. The speaker cone of claim 2, wherein said second plurality of concentric circular regions formed of rigid material substantially line said interior side of said cone.

4. The speaker cone of claim 3, the second plurality of concentric circular regions formed of rigid material include spokes that extend from said base towards said vertex of said body of said speaker cone, said spokes extending radially inwardly through said body and traversing said second plurality of concentric circular regions.

5. The speaker cone of claim 4, wherein said spokes are on said exterior side of said body and substantially all of said soft material of said first plurality of concentric circles is on said exterior side of said body.

6. The speaker cone of claim 5, wherein said rigid material is harder than said soft material by a factor of at least 1 billion.

7. The speaker cone of claim 6, wherein said soft material is meta material silicone.

8. The speaker cone of claim 7, wherein said soft material comprises at least 60% of material of said first and second plurality of said concentric circular regions of said speaker cone.

9. The speaker cone of claim 1, wherein said first plurality of concentric circular regions formed of a soft material and said second plurality of concentric circular regions formed of a rigid material include substantially the same width.

10. The speaker cone of claim 1, wherein said soft material of said first plurality of concentric circular regions includes an elastic modulus of $1.3 \times 10^4$ and density of 500 Kg/m$^3$ and said rigid material of said second plurality of concentric circular regions includes an elastic modulus of $574 \times 10^{10}$ and a density of 1550 Kg/m$^3$.

* * * * *